May 24, 1960 W. A. SAVAGE 2,937,521
ENGINE RADIATOR TESTING DEVICE
Filed Aug. 30, 1957

Inventor
Wilfrid A. Savage
By
Fetherstonhaugh Kent
PATENT ATTORNEYS

United States Patent Office 2,937,521
Patented May 24, 1960

2,937,521
ENGINE RADIATOR TESTING DEVICE
Wilfrid A. Savage, 331 17th Ave. NW.,
Calgary, Alberta, Canada
Filed Aug. 30, 1957, Ser. No. 681,314
3 Claims. (Cl. 73—45.8)

My invention relates to new and useful improvements in engine radiator testing and repair devices, the principal object of my invention being to provide a device of the character herewithin described in which a radiator core may be sealed top and bottom prior to air pressure being introduced therein in order to test said core for leaks and the like.

Conventional radiator cores often require testing for leaks in the tubes thereof and the best way of testing said cores for leaks is to seal same top and bottom and then introduce air pressure within the core after which the core is submerged below water so that the leaks are readily discernible.

It is extremely difficult to seal the top and bottom ends of radiator cores thoroughly so that sufficient air pressure can be introduced in order to show up such leaks, but I have overcome this problem by providing a framework which is sealably attached to the top and bottom of the radiator core and which incorporates an adjustable clamping frame adapted to clamp the framework sealably in position upon the open ends of the core and at the same time which includes means for introducing air into the core after said core has been sealed.

Another object of my invention is to provide a device of the character herewithin described in which the testing or sealing device is adjustable as to the width of the core and also is adjustable to varying plate dimensions of conventional radiators.

Yet another object of my invention is to provide a device of the character herewithin described which is extremely simple to secure to the radiator core and which does not require any prior preparation of the core before use.

A still further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
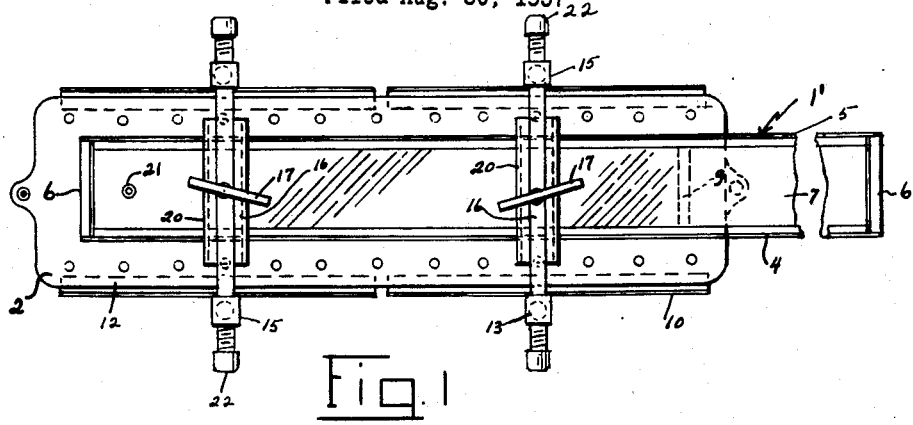
Figure 1 is a top plan view of my device shown in situ upon the upper end of a radiator core.

Proceeding now to describe my invention in detail, it will be seen upon reference to the accompanying drawings that I have illustrated the upper end of a conventional radiator core 1, said upper end including the conventional apertured top plate 2, by which the device is secured to the radiator header tank.

My device collectively designated 1' consists of a sealing portion collectively designated 2' and a clamping frame assembly collectively designated 3. The portion 2' consists of a substantially open framework 4, comprising a pair of longitudinal angle irons 5 and a pair of end angle irons 6. The length of this open framework is sufficient to extend over the width of the majority of conventional radiators so that it can be used on radiators of different sizes.

A rectangular plate 7 spans the underside of the open framework and resilient sealing strips 8 are situated below the plate 7 and around the perimeter thereof.

These resilient sealing strips 8 extend around three sides of the perimeter of the plate 7, the portion 9 of the sealing strip being detachable so that it can be positioned across the plate 7 depending upon the width of radiator upon which the device is being used.

The clamping frame asesmbly is provided in order to clamp the portion 2' in position upon the open end of the radiator core, said assembly including a pair of longitudinal flanged members 10, the horizontal flanges 11 of which are adapted to engage under the longitudinal edges 12 of the aforementioned upper plate 2 of the core and in order to accommodate varying sizes of radiators, these flanged members 10 are adjustable as to width, as will hereinafter be described.

A plurality of vertical struts 13 are secured to the vertical flanges 14 of the members 10 and extend upwardly therefrom, said struts terminating in bearings 15 upon the upper ends thereof. Cylindrical cross members 16 extend through these bearings 15 so that the members 10 are adjustable as to width along these cross members 16 by the sliding engagement thereof within the bearings 15.

Figure 2:
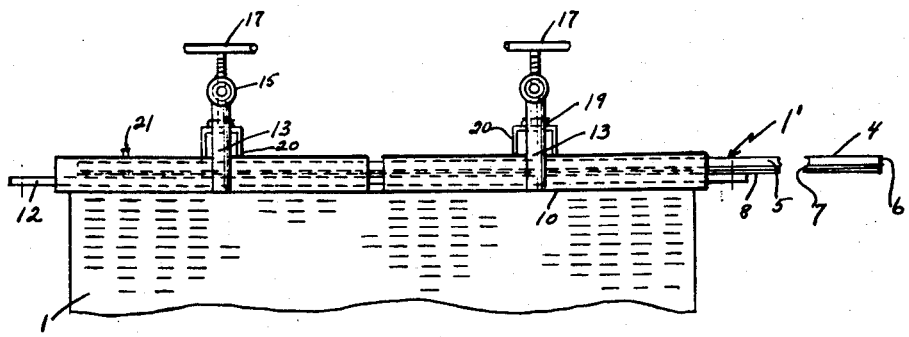
Figure 2 is a side elevation of Figure 1, but with the core shown fragmented.
Figures 3, 5:
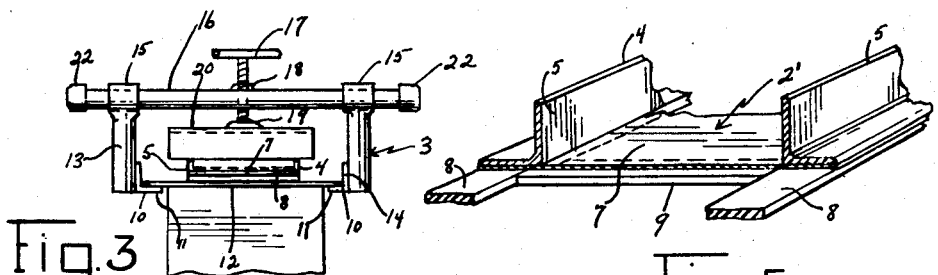
Figure 3 is an end view of Figure 2.
Figure 5 is an enlarged fragmentary perspective view of the device without the clamping frame shown.
Figure 4:
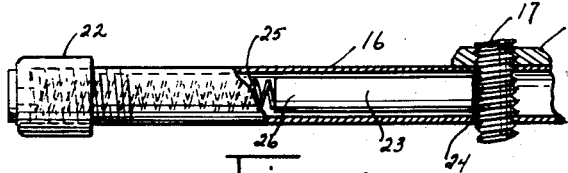
Figure 4 is an enlarged fragmentary cross sectional view of one of the cross members of the device.

A clamping screw 17 is screw-threadably engageable within the cross members 16 supported by screw-threaded bearer blocks 18 and the lower ends 19 of these clamping screws are adapted to engage bridging pieces 20 which are freely positioned transversely across the aforementioned open frame members 5. These bridging pieces are preferably inverted channel members as clearly illustrated in Figure 2 and the action of the clamping screw is to force the open framework 4 downwardly upon the open end of the radiator core thus sealing same securely through the agency of the resilient sealing strips 8 and 9.

In operation, the plate 7 is positioned upon the open end of the radiator core so that the sealing strips 8 engage the boundaries of said open end whereupon the portion 9 of the sealing strip is adjusted depending upon the width of the radiator core being tested. The open framework 4 is then positioned upon the plate 7 as clearly illustrated in Figure 1, whereupon the clamping frame is engaged so that the members 10 engage the longitudinal edges 12 of the plate 2. These members 10 are adjusted as to width through the bearings 15 on the cross members 16 whereupon the bridging pieces 20 are positioned and the clamping screws 17 tightened downwardly thus clamping the device firmly in position and sealing off the end of the radiator core.

A conventional air valve 21 is provided within the plate 7 adjacent one end thereof so that air pressure can be introduced within the radiator core, it being understood that one of these sealing devices is needed for each end of the radiator core in order to seal off same completely.

After air pressure has been introduced to the valve 21, the entire assembly may be submerged under water so that any leaks within the core may readily be ascertained.

The cross members 16 are preferably hollow cylindrical tubes which are provided with screw-threaded end caps 22 engageable over the ends thereof. Wooden plugs 23 are inserted within the tubes 16 and bear against the threads of the clamping screws 17, grease 24 being provided if required. Springs 25 extend between the inner end of the end caps 22 and the outer end 26 of the wooden plugs 23 so that the tension of the plugs against the threads can be adjusted as desired.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for sealing the open upper and lower ends of an engine radiator core preparatory to testing the core with air pressure, comprising in combination a substantially rectangular open framework, a plate spanning the underside of said framework, a flexible sealing gasket on the underside of said plate around the perimeter thereof adapted to engage the boundaries of said open ends of said radiator core, clamping frame to secure said device sealably in position upon said open ends, said clamping frame including a pair of spaced and parallel flanged members adapted to engage under the edges of the end plate of the associated radiator, a pair of bridging pieces spanning said first-mentioned framework, clamp means cooperating between said clamping frame and said bridging pieces, and an air valve in said device communicable with the interior of said core, for introducing air under pressure into said core.

2. The device according to claim 1 in which said clamp means cooperating between said clamping frame and said bridging pieces comprises a plurality of pairs of vertical struts secured to said flanged members and extending upwardly therefrom, a cross member bearably supported between each pair of vertical struts, and a clamping screw engageable within said cross member, the lower end of said clamping screw adapted to engage said bridging pieces.

3. The device according to claim 2 in which said cross members comprise hollow tubes, a plug in one half portion of each of said tubes on one side of said clamping screw, end caps screw-threadably engaging the ends of said tubes, and springs extending between the one of said end caps of said cross members and the plug at this said end.

References Cited in the file of this patent

UNITED STATES PATENTS

| | | |
|---|---|---|
| 1,613,217 | Armstrong | Jan. 4, 1927 |
| 2,231,518 | Boerger | Feb. 11, 1941 |
| 2,534,615 | Miller et al. | Dec. 19, 1950 |
| 2,565,119 | Block | Aug. 21, 1951 |
| 2,750,793 | Lunceford | June 19, 1956 |